(12) United States Patent
Son

(10) Patent No.: US 12,438,167 B2
(45) Date of Patent: Oct. 7, 2025

(54) APPARATUS FOR CONVERTING POWER OF FUEL CELL FOR POWER GENERATION AND METHOD THEREOF

(71) Applicants: Hyundai Motor Company, Seoul (KR); Kia Corporation, Seoul (KR)

(72) Inventor: Yong Doo Son, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 429 days.

(21) Appl. No.: 18/049,728

(22) Filed: Oct. 26, 2022

(65) Prior Publication Data
US 2023/0261225 A1    Aug. 17, 2023

(30) Foreign Application Priority Data
Feb. 16, 2022    (KR) .......................... 10-2022-0020373

(51) Int. Cl.
*H01M 8/04664*    (2016.01)
*H01M 8/04537*    (2016.01)
(Continued)

(52) U.S. Cl.
CPC ... *H01M 8/04671* (2013.01); *H01M 8/04552* (2013.01); *H01M 8/04873* (2013.01);
(Continued)

(58) Field of Classification Search
CPC ........... H01M 8/0488; H01M 8/04917; H01M 8/04902; H01M 8/04552; H01M 8/04559;
(Continued)

(56) References Cited

U.S. PATENT DOCUMENTS 5,023,150 A * 6/1991 Takabayashi ..... H01M 8/04225
429/432
8,808,934 B2   8/2014 Wilson
(Continued)

FOREIGN PATENT DOCUMENTS

JP    2009048972 A    3/2009
JP    4337104 B2      9/2009
(Continued)

OTHER PUBLICATIONS

Machine translation of Ojima et al. Japanese Patent Document JP 2019-96402 A Jun. 2019 (Year: 2019).*

*Primary Examiner* — Kevin J Comber
(74) *Attorney, Agent, or Firm* — MCDONNELL BOEHNEN HULBERT & BERGHOFF LLP

(57) ABSTRACT

An apparatus for converting power of a fuel cell for power generation to remove an open voltage of the fuel cell when a failure occurs during power generation of the fuel cell and a method thereof are provided. A power converter converts and supplies power generated by the fuel cell to a system or load. A controller detects a failure occurring in the fuel cell, the power converter, or the system or load, while the fuel cell is driven, and reduces an open circuit voltage (OCV) of the fuel cell by a dummy resistor connected with an output terminal of the fuel cell, when the failure occurs in the fuel cell, the power converter, or the system or load. The apparatus removes an OCV of a fuel cell stack to prevent performance and life of the fuel cell from being reduced.

16 Claims, 8 Drawing Sheets

(51) Int. Cl.
*H01M 8/04858* (2016.01)
*H02H 1/00* (2006.01)
*H02H 7/18* (2006.01)

(52) U.S. Cl.
CPC ... *H01M 8/04902* (2013.01); *H01M 8/04917* (2013.01); *H02H 1/0007* (2013.01); *H02H 7/18* (2013.01)

(58) Field of Classification Search
CPC .......... H01M 8/04873; H01M 8/04671; H02H 7/122; H02H 7/18; H02H 1/0007; H02M 1/32; H02M 7/5387; Y02E 60/50
USPC ....................................................... 361/93.1
See application file for complete search history.

(56) References Cited

U.S. PATENT DOCUMENTS

| | | | |
|---|---|---|---|
| 8,999,591 | B2 | 4/2015 | Umayahara |
| 2011/0111317 | A1 | 5/2011 | Umayahara |
| 2011/0171547 | A1 | 7/2011 | Wilson |
| 2012/0028138 | A1 | 2/2012 | Lee |
| 2013/0308356 | A1* | 11/2013 | Subramanium ..... H02M 1/4258 363/53 |
| 2016/0254556 | A1 | 9/2016 | Zhang |
| 2018/0162233 | A1* | 6/2018 | Oya .................. H01M 8/04567 |
| 2018/0219373 | A1* | 8/2018 | Hart .......................... H02J 1/14 |

FOREIGN PATENT DOCUMENTS

| | | | | |
|---|---|---|---|---|
| JP | 6187660 | B1 | 8/2017 | |
| JP | 2019096402 | A * | 6/2019 | ........ H01M 8/04298 |
| KR | 20120011598 | A | 2/2012 | |
| KR | 101602002 | B1 | 3/2016 | |
| KR | 20160078401 | A | 7/2016 | |
| KR | 20180075946 | A | 7/2018 | |
| KR | 102317771 | B1 | 10/2021 | |

* cited by examiner

APPARATUS FOR CONVERTING POWER OF FUEL CELL FOR POWER GENERATION AND METHOD THEREOF

CROSS-REFERENCE TO RELATED APPLICATION

This application claims the benefit of priority to Korean Patent Application No. 10-2022-0020373, filed in the Korean Intellectual Property Office on February 16, 2022, the entire contents of which are incorporated herein by reference.

TECHNICAL FIELD

The present disclosure relates to an apparatus for converting power of a fuel cell for power generation and a method thereof, and more particularly, relates to an apparatus for converting power of a fuel cell for power generation to remove an open voltage of the fuel cell when a failure occurs during power generation of the fuel cell and a method thereof.

BACKGROUND

A fuel cell system generates power using hydrogen or the like. In general, the fuel cell system includes a fuel cell stack in which a plurality of fuel cells are laminated. When there is an open circuit voltage (OCV) in a process where the fuel cell stack is stopped, performance and life of the fuel cell may be reduced. There is a scheme of bucking voltage using a resistor as an existing scheme of removing an OCV of the fuel cell. However, when the scheme using the resistor is used, as a passive element is used, it is difficult to adjust a bucking degree as the capacity of the resistor is large, heating occurs, and performance of the stack is reduced. Furthermore, when voltage introduced into the resistor is adjusted through switching, as a ripple current is introduced into a stack, a direct current/direct current (DC/DC) converter, or a direct current/alternating current (DC/AC) inverter, voltage quality is reduced.

Furthermore, it is possible to remove an OCV using a charging function of a high voltage battery in a fuel cell vehicle. However, when the high voltage battery is used, a separate battery and a charging and discharging device may be required and a control process thereof may be complicated. In addition, because a stack and a load (or a system) are connected one to one in a fuel cell for power generation, it is impossible to control an OCV. Thus, there is a need to develop a technology for addressing such problems and controlling an OCV of the fuel cell.

SUMMARY

The present disclosure has been made to solve the above-mentioned problems occurring in the prior art while advantages achieved by the prior art are maintained intact.

An aspect of the present disclosure provides an apparatus for converting power of a fuel cell for power generation to remove an open voltage of the fuel cell when a failure occurs during power generation of the fuel cell and a method thereof.

Another aspect of the present disclosure provides an apparatus for converting power of a fuel cell for power generation to address a problem in which it is impossible to control an open voltage, because a stack and a load (a system) are connected one to one in the fuel cell for power generation and a method thereof.

Another aspect of the present disclosure provides an apparatus for converting power of a fuel cell for power generation to control an open circuit voltage (OCV) of a fuel cell stack without a separate battery and a method thereof.

Another aspect of the present disclosure provides an apparatus for converting power of a fuel cell for power generation to remove an open voltage of the fuel cell, although emergency stop of power generation of the fuel cell is performed due to a failure and a method thereof.

Another aspect of the present disclosure provides an apparatus for converting power of a fuel cell for power generation to prevent performance and life of the fuel cell from being reduced and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for converting power of a fuel cell for power generation may include a power converter that converts and supplies power generated by the fuel cell to a system or load and a controller that detects a failure occurring in the fuel cell, the power converter, or the system or load, while the fuel cell is driven, and reduces an open circuit voltage (OCV) of the fuel cell by a dummy resistor connected with an output terminal of the fuel cell, when the failure occurs in the fuel cell, the power converter, or the system or load.

In an embodiment, the dummy resistor may be connected in parallel between the output terminal of the fuel cell and an input terminal of the power converter to reduce the OCV of the fuel cell.

In an embodiment, the controller may monitor the OCV of the fuel cell and may increase current flowing in the dummy resistor such that the OCV of the fuel cell is less than a reference voltage.

In an embodiment, the controller may stop a current linkage to the system or load by controlling a switching element connected with an input terminal and an output terminal of the power converter to be turned off, when the failure occurs in the fuel cell, the power converter, or the system or load.

In an embodiment, the apparatus may further include a first initial charge circuit connected in parallel between the output terminal of the fuel cell and an input terminal of the power converter to cut off an inrush current from the fuel cell.

In an embodiment, the apparatus may further include a second initial charge circuit connected in series between an output terminal of the power converter and the system or load to cut off an inrush current to the system or load.

In an embodiment, the controller may operate the first initial charge circuit to reduce the OCV of the fuel cell, when the failure occurs in the fuel cell, the power converter, or the system or load.

In an embodiment, the power converter may include a direct current/alternating current P (DC/AC) inverter that converts DC power generated by the fuel cell into AC power.

In an embodiment, the apparatus may further include a filter device connected with an output terminal of the power converter to remove a noise of power output from the power converter.

In an embodiment, the switching element may include a magnetic contactor (MC).

According to another aspect of the present disclosure, a method for converting power of a fuel cell for power generation may include converting and supplying, by a power converter, power generated by the fuel cell to a system or load, detecting, by a controller, a failure occurring in the fuel cell, the power converter, or the system or load, while the fuel cell is driven, and reducing, by the controller, an open circuit voltage (OCV) of the fuel cell by a dummy resistor connected with an output terminal of the fuel cell, when the failure occurs in the fuel cell, the power converter, or the system or load.

In an embodiment, the reducing of the OCV of the fuel cell by the dummy resistor connected with the output terminal of the fuel cell by the controller may include reducing, by the controller, the OCV of the fuel cell by the dummy resistor connected in parallel between the output terminal of the fuel cell and an input terminal of the power converter.

In an embodiment, the reducing of the OCV of the fuel cell by the dummy resistor connected with the output terminal of the fuel cell by the controller may include monitoring, by the controller, the OCV of the fuel cell and increasing, by the controller, current flowing in the dummy resistor such that the OCV of the fuel cell is less than a reference voltage.

In an embodiment, the method may further include stopping, by the controller, a current linkage to the system or load by controlling, by the controller, a switching element connected with an input terminal and an output terminal of the power converter to be turned off, when the failure occurs in the fuel cell, the power converter, or the system or load.

In an embodiment, the method may further include cutting off, by a first initial charge circuit connected in parallel between the output terminal of the fuel cell and an input terminal of the power converter, an inrush current from the fuel cell.

In an embodiment, the method may further include cutting off, by a second initial charge circuit connected in series between an output terminal of the power converter and the system or load, an inrush current to the system or load.

In an embodiment, the method may further include operating, by the controller, the first initial charge circuit to reduce the OCV of the fuel cell, when the failure occurs in the fuel cell, the power converter, or the system or load.

In an embodiment, the converting and supplying of the power generated by the fuel cell to the system or load by the power converter may include converting, by the power converter, DC power generated by the fuel cell into AC power by a DC/AC inverter.

In an embodiment, the method may further include removing, by a filter device connected with an output terminal of the power converter, a noise of power output from the power converter.

In an embodiment, the stopping of the current linkage to the system or load by the controller by controlling, the controller, the switching element connected with the input terminal and the output terminal of the power converter to be turned off may include stopping, by the controller, the current linkage to the system or load by controlling, by the controller, a magnetic contactor (MC) connected with the input terminal and the output terminal of the power converter to be turned off.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
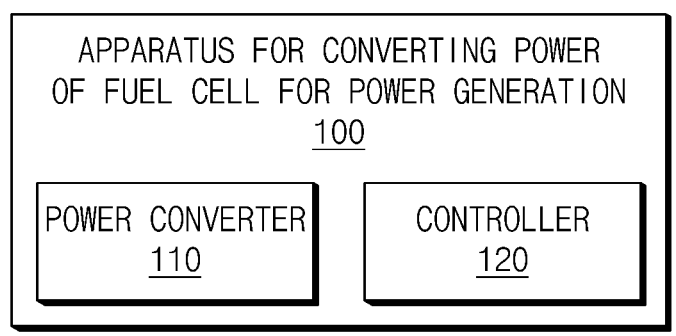
FIG. 1 is a block diagram illustrating an apparatus for converting power of a fuel cell for power generation according to an embodiment of the present disclosure.

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which this disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 7.

FIG. 1 is a block diagram illustrating an apparatus for converting power of a fuel cell for power generation according to an embodiment of the present disclosure.

An apparatus 100 for converting power of a fuel cell for power generation according to an embodiment of the present disclosure may be implemented by being connected with an output terminal of a fuel cell system.

Referring to FIG. 1, the apparatus 100 for converting the power of the fuel cell for power generation may include a power converter 110 and a controller 120.

The power converter 110 may convert and supply power generated by means of the fuel cell to a system or load.

As an example, the power converter 110 may include a DC/AC inverter which converts DC power generated by means of the fuel cell into AC power.

Because DC power is generated from the fuel cell, there is a need to convert the generated DC power into AC power to transfer the generated DC power to the system or load.

As an example, an input terminal of the power converter 110 may be connected with the fuel cell, and an output terminal of the power converter 110 may be connected with the system or load.

A switching element controlled by the controller 120 may be connected with the input terminal and the output terminal of the power converter 110. Thus, a connection between the power converter 110 and the fuel cell and a connection between the power converter 110 and the system or load may be selectively controlled by the controller 120.

As an example, the switching element connected with the input terminal and the output terminal of the power converter 110 or a switching element which turns on or off a connection of a first initial charge circuit which will be described below may include a magnetic contactor (MC).

As another example, the switching element connected with the input terminal and the output terminal of the power converter 110 or the switching element which turns on or off the connection of the first initial charge circuit which will be described below may include a circuit breaker or another type of switching element.

Although not illustrated, as an example, the apparatus 100 for converting the power of the fuel cell for power generation may further include the first initial charge circuit which is connected in parallel between the output terminal of the fuel cell and the input terminal of the power converter 110 to cut off an inrush current from the fuel cell.

As an example, the first initial charge circuit may include one or more resistance element and a capacitance element.

As an example, the first initial charge circuit may include a switching element which turns on or off a connection of the first initial charge circuit. The switching element which turns on or off the connection of the first initial charge circuit may be controlled by the controller 120.

Although not illustrated, as an example, the apparatus 100 for converting the power of the fuel cell for power generation may further include a second initial charge circuit which is connected in series between the output terminal of the power converter 110 and the system or load to cut off an inrush current to the system or load.

As an example, the second initial charge circuit may include one or more resistance element and a capacitance element.

As an example, because the second initial charge circuit is connected in series between the output terminal of the power converter 110 and the system or load, when the switching element connected with the output terminal of the power converter 110 is turned on, the second initial charge circuit may operate automatically to cut off an inrush current to the system or load.

Although not illustrated, as an example, the apparatus 100 for converting the power of the fuel cell for power generation may further include a filter device which is connected with the output terminal of the power converter 110 to remove a noise of power output from the power converter 110.

As an example, the filter device may include an electromagnetic interference (EMI) filter which removes or reduces noise, or the like.

The controller 120 may include one or more processors which perform data processing and/or calculation which will be described below. Furthermore, the controller 120 may include a memory which stores data or an algorithm required in a process of performing data processing and/or calculation.

The controller 120 may perform the overall control such that respective components may normally perform their own functions. Such a controller 120 may be implemented in the form of hardware, may be implemented in the form of software, or may be implemented in the form of a combination thereof. Preferably, the controller 120 may be implemented as, but not limited to, one or more microprocessors.

The memory capable of being included in the controller 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, or an optical disk.

As an example, the controller 120 may be connected with the power converter 110, the first initial charge circuit, the second initial charge circuit, the filter device, or the like and may output and deliver a signal for controlling each component.

As an example, the controller 120 may control on or off of the switching element connected with the input terminal and the output terminal of the power converter 110 or the switching element which turns on or off the connection of the first initial charge circuit.

The controller 120 may detect a failure which occurs in the fuel cell, the power converter 110, or the system or load, while the fuel cell is driven.

As an example, the controller 120 may include a failure diagnosis device which diagnoses a failure or abnormality in the fuel cell, the power converter 110, or the system or load.

As another example, the controller 120 may receive information about a failure or abnormality which occurs in the fuel cell, the power converter 110, or the system or load from another component connected with the fuel cell, the power converter 110, or the system or load to diagnose the failure or abnormality in the fuel cell, the power converter 110, or the system or load and may detect the failure or abnormality which occurs in the fuel cell, the power converter 110, or the system or load.

When the failure occurs in the fuel cell, the power converter 110, or the system or load, the controller 120 may reduce an open circuit voltage (OCV) of the fuel cell by means of a dummy resistor connected with the output terminal of the fuel cell.

As an example, the dummy resistor may be connected in parallel between the output terminal of the fuel cell and the input terminal of the power converter 110 to reduce an OCV of the fuel cell.

A current linkage to the system should be cut off immediately when the failure occurs in the fuel cell, the power converter 110, or the system or load during power generation of the fuel cell, and the power generation of the fuel cell should be stopped.

As an example, when the failure occurs in the fuel cell, the power converter 110, or the system or load, the controller 120 may stop the current linkage to the system or load by controlling the switching element connected with the input terminal and the output terminal of the power converter 110 to be turned off.

Although the current linkage to the system is cut off and the power generation of the fuel cell is stopped, because the output of the fuel cell does not become "0" immediately, the OCV of the fuel cell may be present when the current linkage to the system is cut off when a failure in the fuel cell occurs.

When current output from the fuel cell is connected with the dummy resistor before stop logic of the fuel cell is completed, after the power generation of the fuel cell is stopped, the OCV of the fuel cell may be reduced due to a voltage drop through the dummy resistor.

As an example, the controller 120 may determine whether the stop logic of the fuel cell is completed. When the stop logic of the fuel cell is completed, the controller 120 may end the current linkage to the dummy resistor.

When the stop logic of the fuel cell is completed, because the output of the fuel cell becomes "0" or decreases to a degree equivalent to "0", although the current linkage to the dummy resistor is ended, the OCV of the fuel cell may not present.

As an example, the controller 120 may be connected with a fuel cell system to receive information about whether the stop logic of the fuel cell is completed from the fuel cell system and may identify whether the stop logic of the fuel cell is completed.

As another example, the controller 120 may directly perform the stop logic of the fuel cell and may determine whether the stop logic of the fuel cell is completed.

As an example, the controller 120 may link current to the dummy resistor by controlling the switching element connected with the fuel cell and the dummy resistor to be turned on.

When the switching element connected with the fuel cell and the dummy resistor is controlled to be turned on, current output from the fuel cell may be connected with the dummy resistor.

As an example, the controller 120 may monitor an OCV of the fuel cell and may increase current linked to the dummy resistor such that the OCV of the fuel cell is less than a reference voltage.

As an example, the controller 120 may measure a voltage of the output terminal of the fuel cell to monitor the OCV of the fuel cell.

As another example, the controller 120 may receive information about the OCV of the fuel cell from a component loaded into the fuel cell system to measure the OCV of the fuel cell and may monitor the OCV of the fuel cell.

When current linked to the dummy resistor increases, as a voltage drop through the dummy resistor increases, the OCV of the fuel cell may decrease more.

As an example, the reference voltage may be predetermined to a value small enough to be determined that the OCV of the fuel cell is not present.

As an example, after current starts to be linked from the fuel cell to the dummy resistor, when the linked current increases and the OCV of the fuel cell is less than the reference voltage, the controller 120 may determine that the removal of the OCV is completed.

As an example, when a failure occurs in the fuel cell, the power converter 110, or the system or load, the controller 120 may operate the first initial charge circuit to reduce an OCV of the fuel cell.

When the first initial charge circuit is operated, as a voltage drop by a resistance element or a capacitance element included in the first initial charge circuit occurs, the OCV of the fuel cell may be reduced.

As an example, the controller 120 may turn on the switching element connected with the first initial charge circuit to operate the first initial charge circuit, thus reducing the OCV of the fuel cell.

Figure 2:
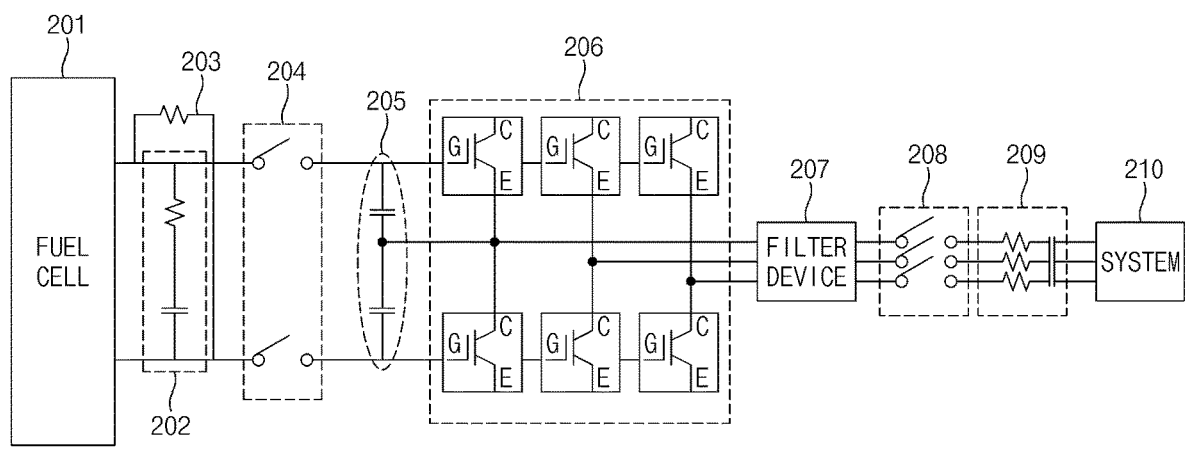
FIG. 2 is a drawing illustrating a detailed configuration of an apparatus for converting power of a fuel cell for power generation according to an embodiment of the present disclosure.

FIG. 2 is a drawing illustrating a detailed configuration of an apparatus for converting power of a fuel cell for power generation according to an embodiment of the present disclosure.

Referring to FIG. 2, a first initial charge circuit 202 may be connected in parallel with an output terminal of a fuel cell 201.

The first initial charge circuit 202 may cut off an inrush current in a process where DC power output through the fuel cell 201 is delivered to a power converter 206.

A dummy resistor 203 may be connected in parallel between an output terminal of the fuel cell 201 and an input terminal of the power converter 206 to reduce an OCV of the fuel cell 201.

A DC input breaker 204 connected between an input terminal of the power converter 206 and the fuel cell 201 may connect or block an input of the power converter 206.

As an example, the DC input breaker 204 may include a magnetic contactor (MC).

Furthermore, although not illustrated, as an example, a DC/DC converter may be connected between the fuel cell 201 and the power converter 206 to convert an output of the fuel cell 201.

A DC link voltage may refer to a voltage of a portion 205 with which the input terminal of the power converter 206 and the DC input breaker 204 are connected.

The power converter 206 may convert DC power at the fuel cell 201 into AC power and may supply the AC power to a system 210.

A filter device 207 connected with the output terminal of the power converter 206 may remove a noise of power output from the output terminal.

An AC system breaker 208 connected with the output terminal of the power converter 206 may connect or cut off the converted AC power to or from a system 210.

As an example, the AC system breaker 208 may include a magnetic contactor (MC).

A second initial charge circuit 209 may be connected in series with the output terminal of the power converter 206.

The second initial charge circuit 209 may include a resistance element and a capacitance element and may cut off an inrush current in a process where AC power output through the power converter 206 is delivered to the system 210.

Figure 3:
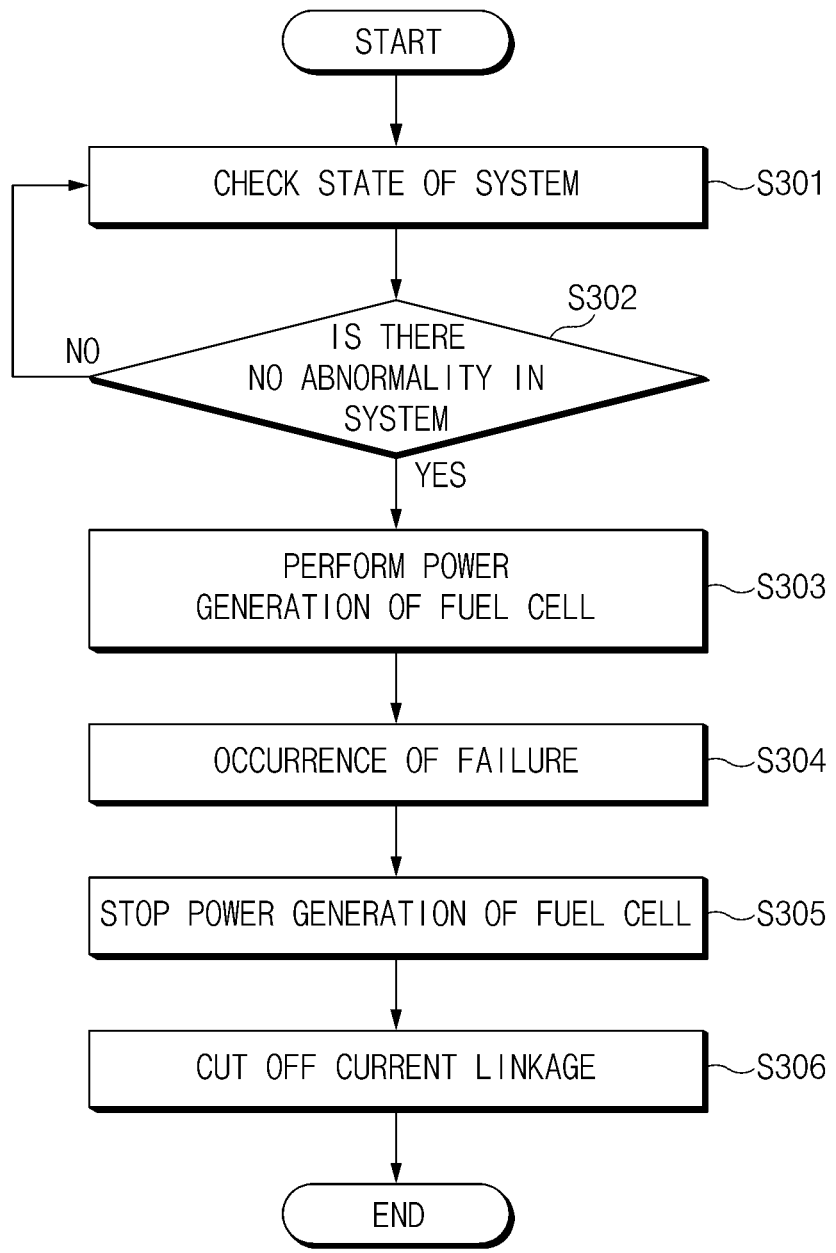
FIG. 3 is a flowchart illustrating an operation of an existing apparatus for converting power of a fuel cell for power generation.

FIG. 3 is a flowchart illustrating an operation of an existing apparatus for converting power of a fuel cell for power generation.

Referring to FIG. 3, in S301, the existing apparatus for converting the power of the fuel cell for power generation may check a state of a system.

In S302, the existing apparatus for converting the power of the fuel cell for power generation may identify whether there is no abnormality in the system.

As an example, the existing apparatus for converting the power of the fuel cell for power generation may diagnose whether there is no failure or abnormality in the system or load which is a target to which power output from the fuel cell is converted and supplied.

When there is the abnormality in the system, the existing apparatus for converting the power of the fuel cell for power generation may return to S301 to check the state of the system.

When there is no abnormality in the system, in S303, the existing apparatus for converting the power of the fuel cell for power generation may perform power generation of the fuel cell.

In S304, the existing apparatus for converting the power of the fuel cell for power generation may detect that a failure occurs.

As an example, the existing apparatus for converting the power of the fuel cell for power generation may detect a failure which occurs in the fuel cell, a power converter, or the system or load, while the fuel cell is driven.

In S305, the existing apparatus for converting the power of the fuel cell for power generation may stop the power generation of the fuel cell.

As an example, the existing apparatus for converting the power of the fuel cell for power generation may be connected with a fuel cell system may transmit a signal for ending the power generation of the fuel cell to end the power generation of the fuel cell.

When the failure occurs, in S306, the existing apparatus for converting the power of the fuel cell for power generation may cut off a current linkage to the system.

As an example, when the failure occurs, the existing apparatus for converting the power of the fuel cell for power generation may turn off a switching element connected with an input terminal and an output terminal of the power converter together with ending the power conversion, thus stopping the current linkage to the system or load.

An open voltage of the fuel cell may be generated before stop logic of a fuel cell stack is completed in S305 and S306.

According to the existing apparatus for converting the power of the fuel cell for power generation, although the power conversion and the current linkage to the system or load are ended, an OCV of the fuel cell may be present before the stop logic of the fuel cell is completed.

When the OCV of the fuel cell is generated before the stop logic of the fuel cell is completed, the fuel cell stack may be damaged.

However, the existing apparatus for converting the power of the fuel cell for power generation may not perform an operation of removing an open voltage, when a failure occurs.

Figure 4:
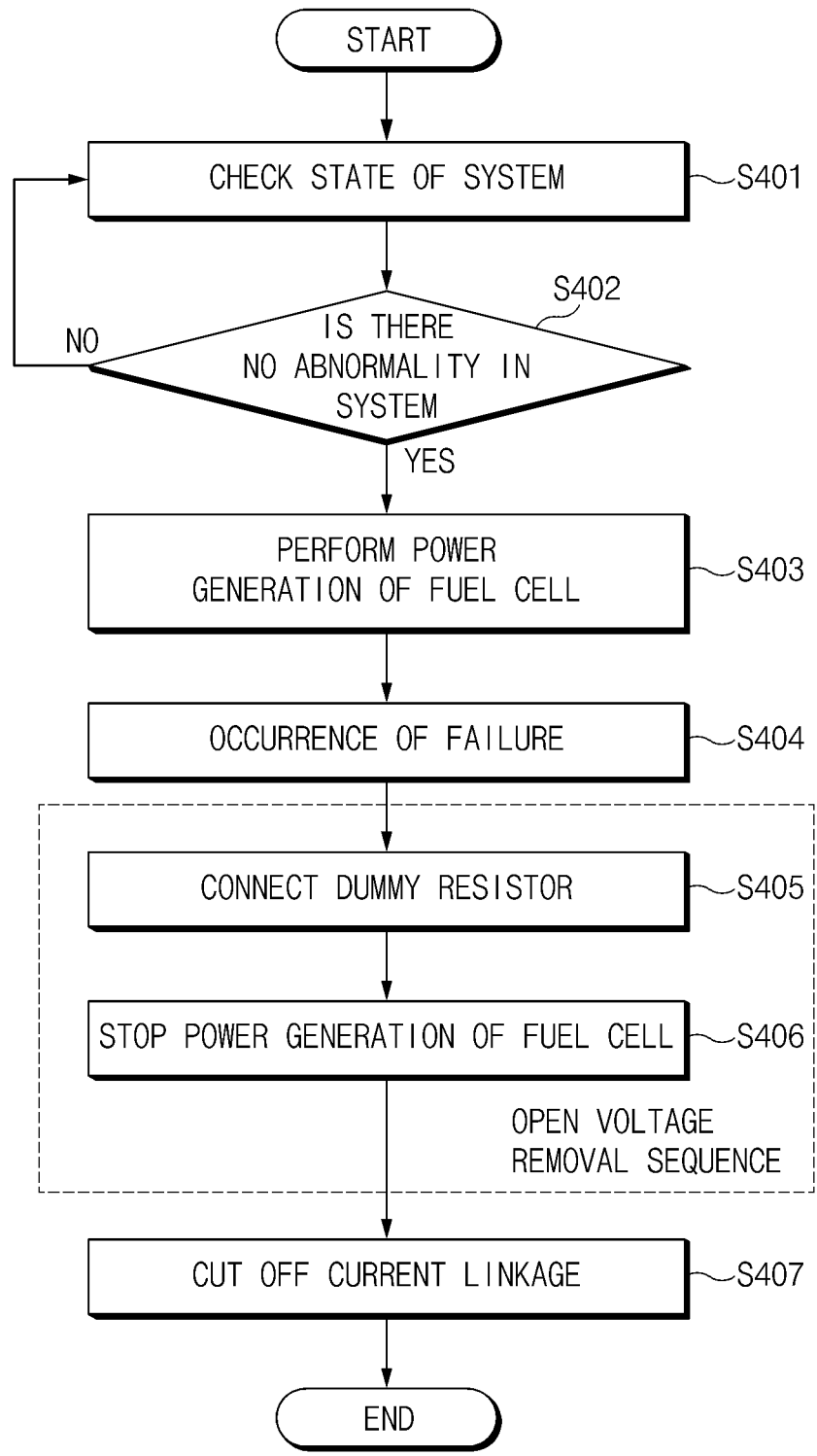
FIG. 4 is a flowchart illustrating an operation of an apparatus for converting power of a fuel cell for power generation according to an embodiment of the present disclosure.

FIG. 4 is a flowchart illustrating an operation of an apparatus for converting power of a fuel cell for power generation according to an embodiment of the present disclosure.

Referring to FIG. 4, in S401, the apparatus for converting the power of the fuel cell for power generation may check a state of a system.

In S402, the apparatus for converting the power of the fuel cell for power generation may identify whether there is no abnormality in the system.

As an example, the apparatus for converting the power of the fuel cell for power generation may diagnose whether there is no failure or abnormality in the system or load which is a target to which power output from the fuel cell is converted and supplied.

When there is the abnormality in the system, the apparatus for converting the power of the fuel cell for power generation may return to S401 to check the state of the system.

When there is no abnormality in the system, in S403, the apparatus for converting the power of the fuel cell for power generation may perform power generation of the fuel cell.

In S404, the apparatus for converting the power of the fuel cell for power generation may detect that a failure occurs.

As an example, the apparatus for converting the power of the fuel cell for power generation may detect a failure which occurs in the fuel cell, a power converter, or the system or load, while the fuel cell is driven.

The operation performed in S401 to S404 by the apparatus for converting the power of the fuel cell for power generation may be the same as an operation performed in S301 to S304 of FIG. 3 by an existing apparatus for converting power of a fuel cell for power generation.

In S405, the apparatus for converting the power of the fuel cell for power generation may connect a dummy resistor.

As an example, the apparatus for converting the power of the fuel cell for power generation may connect the fuel cell with the dummy resistor by controlling the switching element connected with the fuel cell and the dummy resistor to be turned on.

An OCV of the fuel cell may be reduced by means of the dummy resistor.

After connecting the dummy resistor, in 5406, the apparatus for converting the power of the fuel cell for power generation may stop the power generation of the fuel cell.

As an example, the apparatus for converting the power of the fuel cell for power generation may be connected with a fuel cell system and may transmit a signal for ending the power generation of the fuel cell to end the power generation of the fuel cell.

When the failure occurs, in S407, the apparatus for converting the power of the fuel cell for power generation may cut off a current linkage to the system.

As an example, when the failure occurs, the apparatus for converting the power of the fuel cell for power generation may turn off a switching element connected with an input terminal and an output terminal of a power converter together with ending the power conversion, thus stopping the current linkage to the system or load.

Through S405 to S406, the apparatus for converting the power of the fuel cell for power generation may remove the OCV capable of being generated before the stop logic of the fuel cell stack is completed.

As an example, when the stop logic of the fuel cell stack is completed, the apparatus for converting the power of the fuel cell for power generation may turn off the switching element connected with the input terminal and the output terminal of the power converter together with ending the power conversion, thus stopping the current linkage to the system or load.

Although not illustrated, as another example, the apparatus for converting the power of the fuel cell for power generation may connect a first initial charge circuit with the fuel cell to reduce an OCV.

As an example, the apparatus for converting the power of the fuel cell for power generation may connect the first initial charge circuit with the fuel cell by controlling the switching element connected with the first initial charge circuit to be turned on.

Figure 5A:
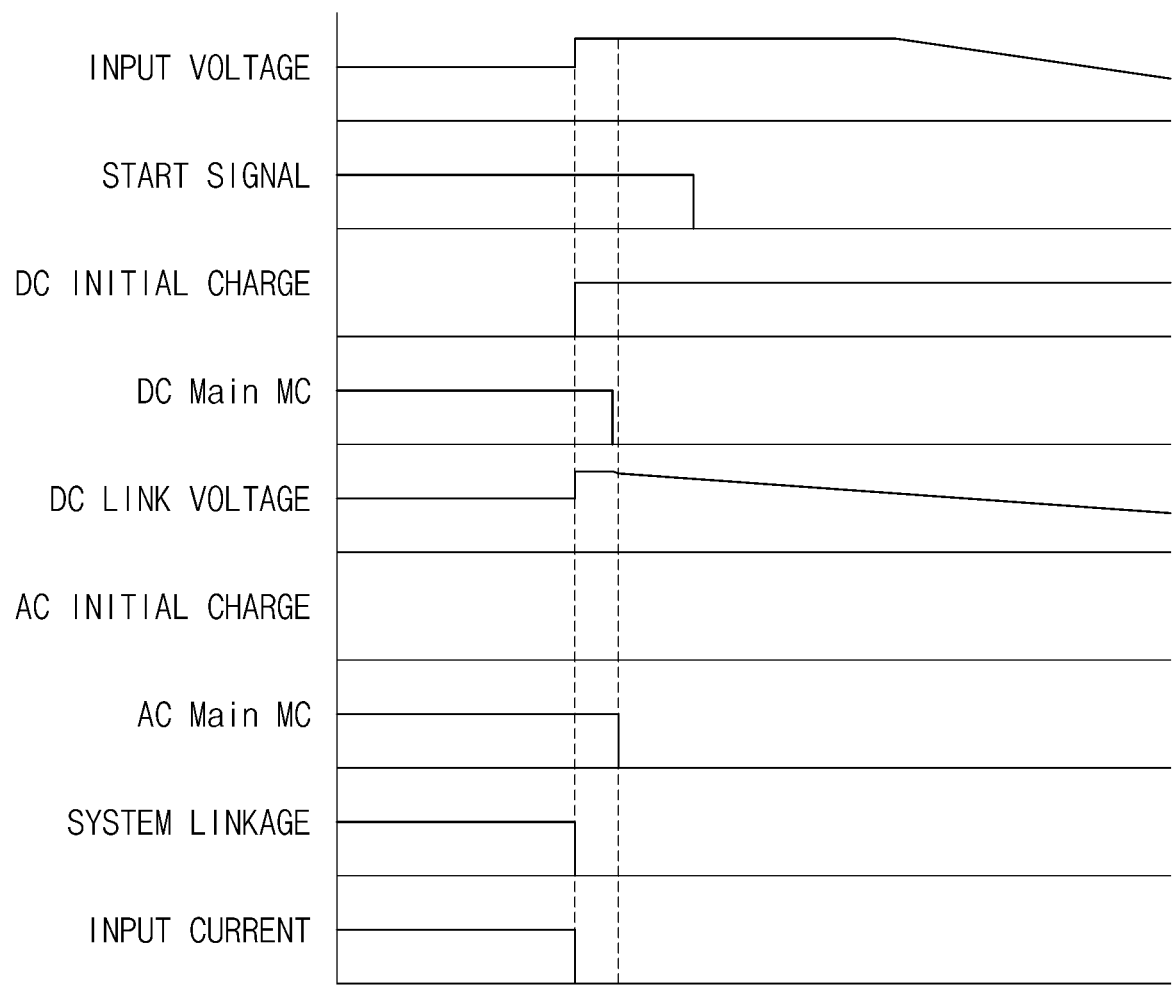
FIG. 5A is a drawing illustrating various signals according to an operation of an existing apparatus for converting power of a fuel cell for power generation.

FIG. 5A is a drawing illustrating various signals according to an operation of an existing apparatus for converting power of a fuel cell for power generation.

Referring to FIG. 5A, by the existing apparatus for converting the power of the fuel cell for power generation, when a failure occurs in the fuel cell, a power converter, or a system or load, a system linkage may be ended, a DC main magnetic contactor may be turned off, and an AC main magnetic contactor may be turned off, and a start signal may be ended.

As an example, the start signal may be output by a controller of the existing apparatus for converting the power of the fuel cell for power generation and may be delivered to a fuel cell system.

In response to the end of the start signal, main power generation of the fuel cell may be ended.

By the existing apparatus for converting the power of the fuel cell for power generation, as the system linkage is ended, an input current may also be ended.

The input current may refer to current delivered to the system.

Furthermore, by the existing apparatus for converting the power of the fuel cell for power generation, as the system linkage is ended, DC initial charge may be performed.

As an example different from that shown in the graph, by the existing apparatus for converting the power of the fuel cell for power generation, although the system linkage is ended, DC initial charge may not be performed.

By the existing apparatus for converting the power of the fuel cell for power generation, unlike those shown in the graph, some or all of a current linkage to the system, off of the DC main magnetic contactor, off of the AC main magnetic contactor, and end of the start signal may be performed at the same time.

By the existing apparatus for converting the power of the fuel cell for power generation, as the system linkage is ended, an input voltage may increase because a load disappears.

Herein, the input voltage may refer to a voltage of an output terminal of the fuel cell.

At this time, an OCV may be generated in the fuel cell.

The DC main magnetic contactor may serve as a switching element which turns on or off a connection between the power converter and the fuel cell.

The AC main magnetic contactor may serve as a switching element which turns on or off a connection between the power converter and the system.

As stop logic of the fuel cell is performed while the OCV is maintained in the fuel cell, the input voltage may decrease.

Furthermore, as the DC main magnetic contactor is turned off, a DC link voltage may start to decrease.

The DC link voltage may refer to a voltage of a portion in which an input terminal of the power converter and a DC initial charge circuit or a DC main magnetic contactor are connected with each other.

By the existing apparatus for converting the power of the fuel cell for power generation, an AC initial charge circuit may not operate in a process of stopping the fuel cell.

As an example, control of the DC initial charge, the DC main magnetic contactor, and the AC main magnetic contactor may be performed by a controller of the existing apparatus for converting the power of the fuel cell for power generation.

According to a topology and a control order of the existing apparatus for converting the power of the fuel cell for power generation, when a failure occurs in the fuel cell, the power converter, or the system or load, as the current linkage to the system is ended before the stop logic of the fuel cell is completed, an OCV of the fuel cell, which is generated before the stop logic of the fuel cell is completed, is not removed.

Figure 5B:
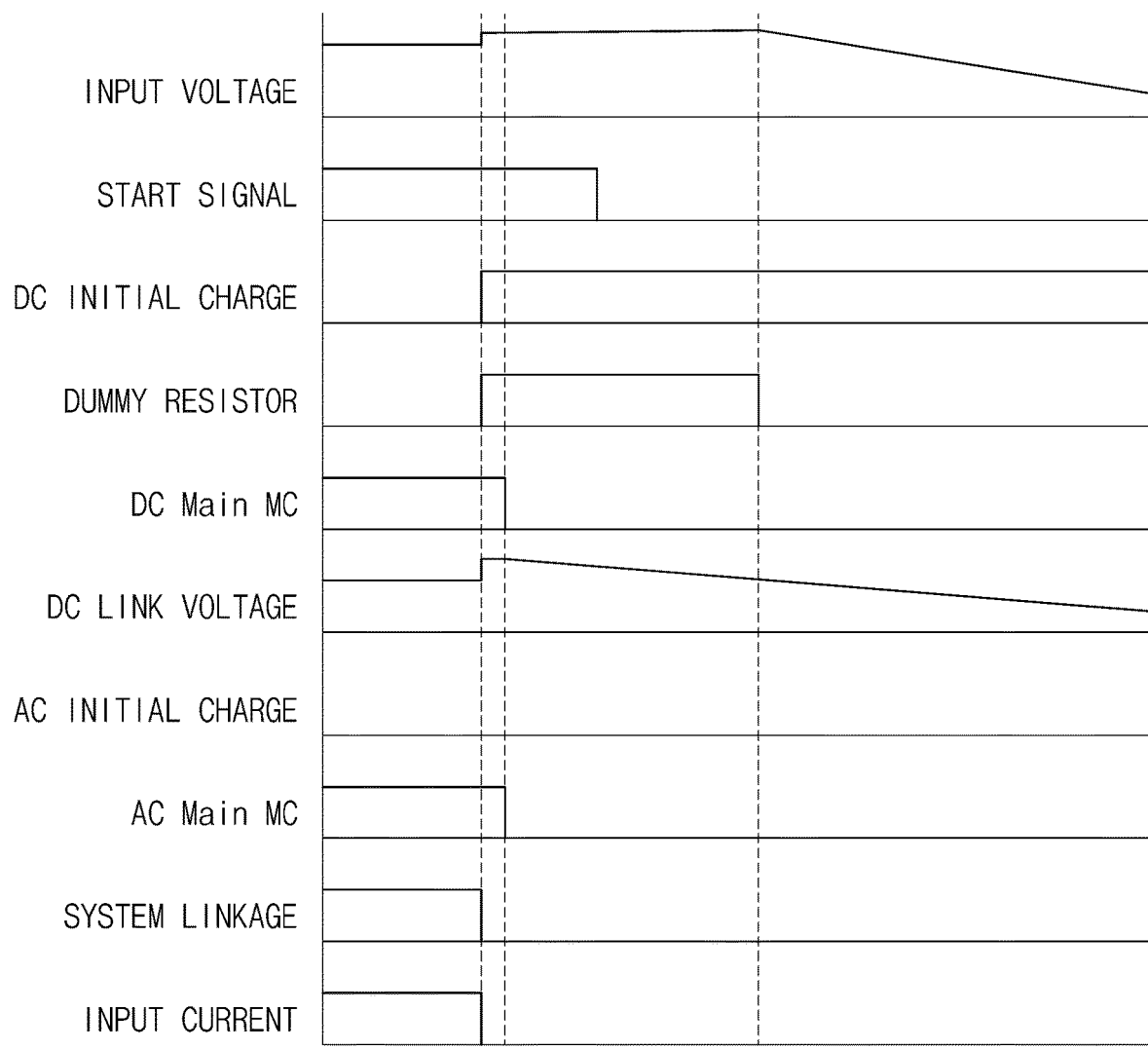
FIG. 5B is a drawing illustrating various signals according to an operation of an apparatus for converting power of a fuel cell for power generation according to an embodiment of the present disclosure.

FIG. 5B is a drawing illustrating various signals according to an operation of an apparatus for converting power of a fuel cell for power generation according to an embodiment of the present disclosure.

Referring to FIG. 5B, by the apparatus for converting the power of the fuel cell for power generation according to an embodiment of the present disclosure, like an existing apparatus for converting power of a fuel cell for power generation, when a failure occurs in the fuel cell, a power converter, or a system or load, a system linkage may be ended, a DC main magnetic contactor may be turned off, and an AC main magnetic contactor may be turned off, and a start signal may be ended.

As an example, the start signal may be output by a controller of the apparatus for converting the power of the fuel cell for power generation according to an embodiment of the present disclosure and may be delivered to a fuel cell system.

In response to the end of the start signal, main power generation of the fuel cell may be ended.

By the apparatus for converting the power of the fuel cell for power generation according to an embodiment of the present disclosure, as the system linkage is ended, an input current may also be ended.

The input current may refer to current delivered to the system.

Furthermore, by the apparatus for converting the power of the fuel cell for power generation according to an embodiment of the present disclosure, as the system linkage is ended, because DC initial charge is performed, an OCV of the fuel cell may decrease due to a voltage drop by DC initial charge.

By the apparatus for converting the power of the fuel cell for power generation according to an embodiment of the present disclosure, unlike those shown in the graph, some or all of a current linkage to the system, off of the DC main magnetic contactor, off of the AC main magnetic contactor, and end of the start signal may be performed at the same time.

By the apparatus for converting the power of the fuel cell for power generation according to an embodiment of the present disclosure, when a failure occurs in the fuel cell, the power converter, or the system or load, a dummy resistor may be connected with the fuel cell.

By the apparatus for converting the power of the fuel cell for power generation according to an embodiment of the present disclosure, although the system linkage is ended, an OCV of the fuel cell may be reduced or removed due to a voltage drop by the dummy resistor.

By the apparatus for converting the power of the fuel cell for power generation according to an embodiment of the present disclosure, when the system linkage is ended, a degree to which the input voltage increases may be smaller than the existing apparatus for converting the power of the fuel cell for power generation.

Herein, the input voltage may refer to a voltage of an output terminal of the fuel cell.

The DC main magnetic contactor may serve as a switching element which turns on or off a connection between the power converter and the fuel cell.

The AC main magnetic contactor may serve as a switching element which turns on or off a connection between the power converter and the system.

As stop logic of the fuel cell is performed, the input voltage may decrease.

Furthermore, as the DC main magnetic contactor is turned off, a DC link voltage may start to decrease.

The DC link voltage may refer to a voltage of a portion in which an input terminal of the power converter and a DC initial charge circuit or a DC main magnetic contactor are connected with each other.

By the apparatus for converting the power of the fuel cell for power generation according to an embodiment of the present disclosure, an AC initial charge circuit may not operate in a process of stopping the fuel cell.

As an example, control of the DC initial charge, the DC main magnetic contactor, and the AC main magnetic contactor may be performed by a controller of the apparatus for converting the power of the fuel cell for power generation according to an embodiment of the present disclosure.

According to a topology and a control order of the apparatus for converting the power of the fuel cell for power generation according to an embodiment of the present disclosure, when a failure occurs in the fuel cell, the power converter, or the system or load, as current is linked to the dummy resistor, an OCV of the fuel cell, which is generated before the stop logic of the fuel cell is ended, may be removed.

The apparatus for converting the power of the fuel cell for power generation according to an embodiment of the present disclosure may change only a control order without correcting the hardware or topology of the existing apparatus for converting the power of the fuel cell for power generation to remove an OCV of the fuel cell.

Figure 6:
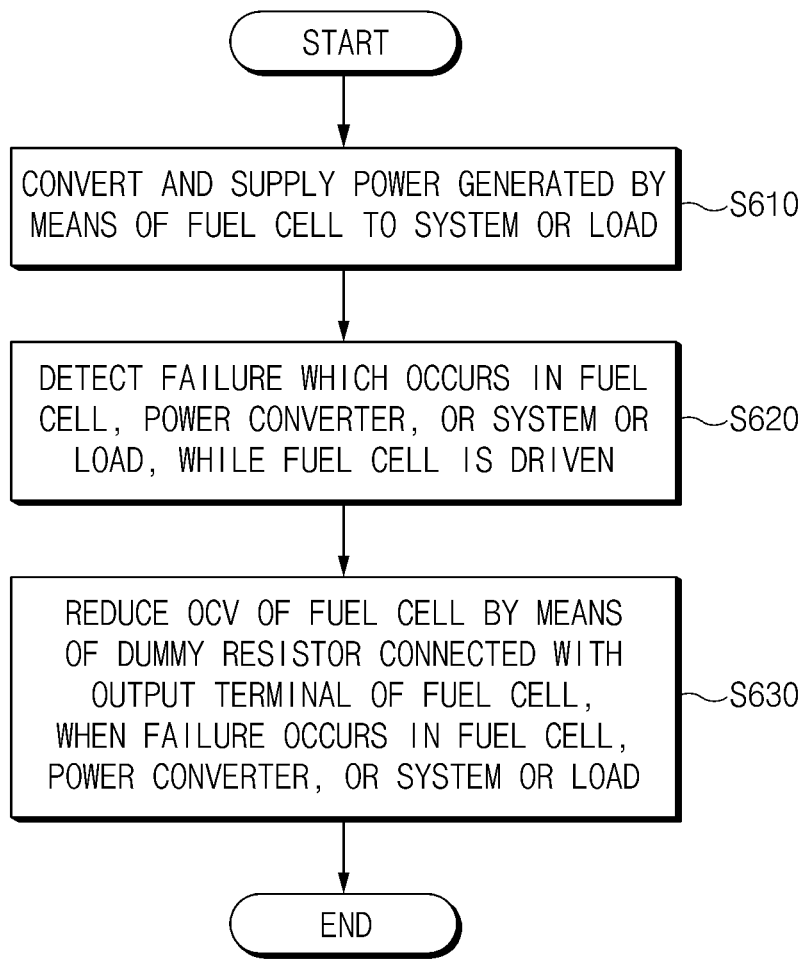
FIG. 6 is a flowchart illustrating a method for converting power of a fuel cell for power generation according to an embodiment of the present disclosure.

FIG. 6 is a flowchart illustrating a method for converting power of a fuel cell for power generation according to an embodiment of the present disclosure.

Referring to FIG. 6, the method for converting the power of the fuel cell for power generation may include converting and supplying (S610) power generated by means of the fuel cell to a system or load, detecting (S620) a failure which occurs in the fuel cell, a power converter, or the system or load, while the fuel cell is driven, and reducing (S630) an OCV of the fuel cell by means of a dummy resistor connected with an output terminal of the fuel cell, when the failure occurs in the fuel cell, the power converter, or the system or load.

The converting and supplying (S610) of the power generated by means of the fuel cell to the system or load may be performed by the power converter.

As an example, the converting and supplying (S610) of the power generated by means of the fuel cell to the system or load may include converting, by the power converter, DC power generated by means of the fuel cell into AC power by means of a DC/AC inverter.

The detecting (S620) of the failure which occurs in the fuel cell, the power converter, or the system or load, while the fuel cell is driven, may be performed by a controller.

The reducing (S630) of the OCV of the fuel cell by means of the dummy resistor connected with the output terminal of the fuel cell, when the failure occurs in the fuel cell, the power converter, or the system or load, may be performed by the controller.

As an example, the reducing (S630) of the OCV of the fuel cell by means of the dummy resistor connected with the output terminal of the fuel cell may include reducing, by the controller, the OCV of the fuel cell by means of the dummy resistor connected in parallel between the output terminal of the fuel cell and an input terminal of the power converter.

As an example, the reducing (S630) of the OCV of the fuel cell by means of the dummy resistor connected with the output terminal of the fuel cell may include monitoring, by the controller, the OCV of the fuel cell and increasing, by the controller, current flowing in the dummy resistor such that the OCV of the fuel cell is less than a reference voltage.

As an example, the method for converting the power of the fuel cell for power generation may include stopping, by the controller, the current linkage to the system or load by controlling, by the controller, a switching element connected with an input terminal and an output terminal of the power converter to be turned off, when the failure occurs in the fuel cell, the power converter, or the system or load.

As an example, the stopping of the current linkage to the system or load by the controller by controlling, by the controller, the switching element connected with the input terminal and the output terminal of the power converter to be turned off may include stopping, by the controller, the current linkage to the system or load by controlling, by the controller, a magnetic contactor connected with the input terminal and the output terminal of the power converter to be turned off.

As an example, the method for converting the power of the fuel cell for power generation may further include cutting off, by a first initial charge circuit connected in parallel between the output terminal of the fuel cell and the input terminal of the power converter, an inrush current from the fuel cell.

As an example, the method for converting the power of the fuel cell for power generation may further include cutting off, by a second initial charge circuit connected in series between the output terminal of the power converter and the system or load, an inrush current to the system or load.

As an example, the method for converting the power of the fuel cell for power generation may further include operating, by the controller, the first initial charge circuit to reduce the OCV of the fuel cell, when the failure occurs in the fuel cell, the power converter, or the system or load.

As an example, the method for converting the power of the fuel cell for power generation may further include removing, by a filter device connected with the output terminal of the power converter, a noise of power output from the power converter.

Figure 7:
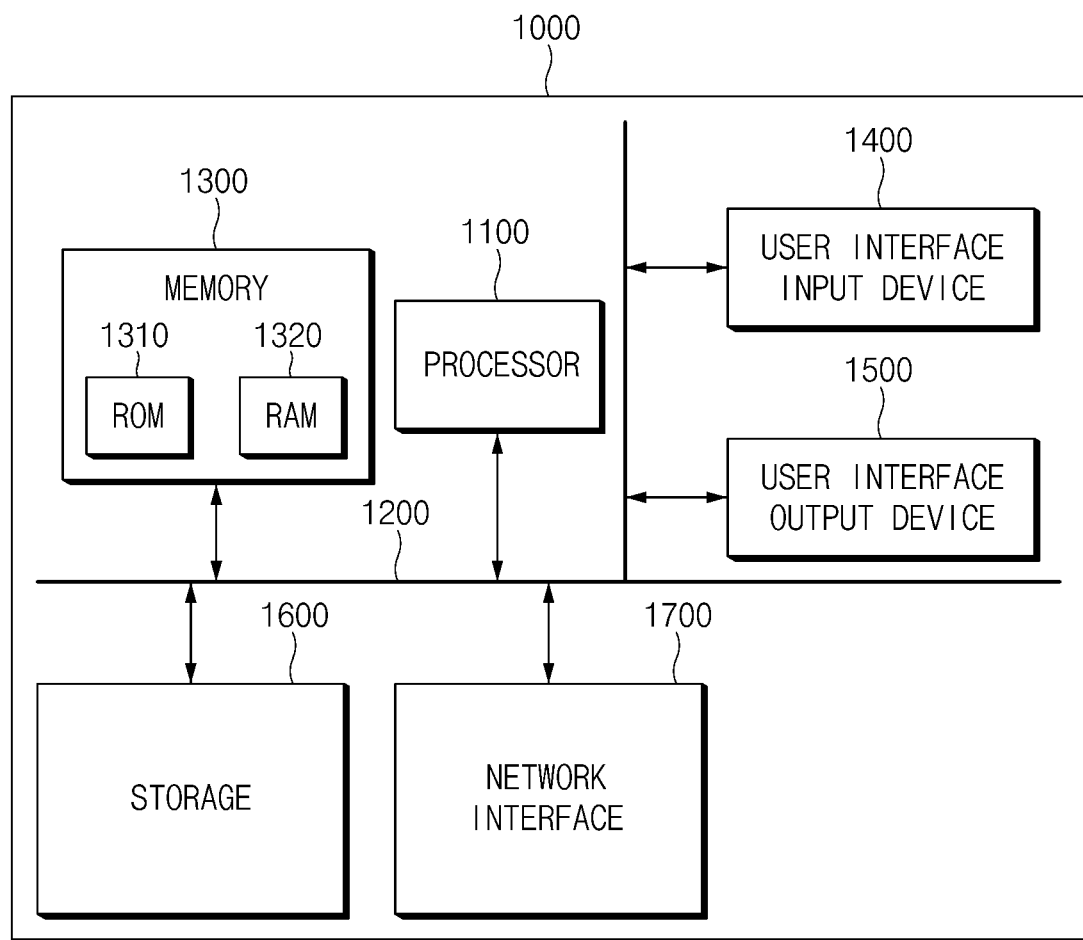
FIG. 7 is a block diagram illustrating a computing system according to an embodiment of the present disclosure.

FIG. 7 is a block diagram illustrating a computing system according to an embodiment of the present disclosure.

Referring to FIG. 7, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

A description will be given of effects of the apparatus for converting the power of the fuel cell for power generation and the method thereof according to an embodiment of the present disclosure.

According to at least one of embodiments of the present disclosure, the apparatus for converting the power of the fuel cell for power generation and the method thereof may be provided to remove an open voltage of the fuel cell, when a failure occurs during power generation of the fuel cell.

According to at least one of embodiments of the present disclosure, the apparatus for converting the power of the fuel cell for power generation and the method thereof may be provided to address a problem in which it is impossible to control an open voltage, because a stack and a load (a system) are connected one to one in the fuel cell for power generation.

According to at least one of embodiments of the present disclosure, the apparatus for converting the power of the fuel cell for power generation and the method thereof may be provided to control an open circuit voltage (OCV) of a fuel cell stack without a separate battery.

Furthermore, According to at least one of embodiments of the present disclosure, the apparatus for converting the power of the fuel cell for power generation and the method thereof may be provided to remove an open voltage of the fuel cell, although emergency stop of power generation of the fuel cell is performed due to a failure.

According to at least one of embodiments of the present disclosure, the apparatus for converting the power of the fuel cell for power generation and the method thereof may be provided to prevent performance and life of the fuel cell from being reduced.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. An apparatus for converting power of a fuel cell for power generation, the apparatus comprising:
   a power converter configured to convert and supply power generated by the fuel cell to a system or load;
   a controller configured to detect a failure occurring in the fuel cell, the power converter, or the system or load, while the fuel cell is driven and reduce an open circuit voltage (OCV) of the fuel cell by a dummy resistor connected with an output terminal of the fuel cell, when the failure occurs in the fuel cell, the power converter, or the system or load; and
   a first initial charge circuit connected in parallel between the output terminal of the fuel cell and an input terminal of the power converter and configured to cut off an inrush current from the fuel cell,
   wherein the controller monitors the OCV of the fuel cell in a process where the fuel cell is stopped and increases current flowing in the dummy resistor such that the OCV of the fuel cell is less than a reference voltage.

2. The apparatus of claim 1, wherein the dummy resistor is connected in parallel between the output terminal of the fuel cell and an input terminal of the power converter to reduce the OCV of the fuel cell.

3. The apparatus of claim 1, wherein the controller stops a current linkage to the system or load by controlling a switching element connected with an input terminal and an output terminal of the power converter to be turned off, when the failure occurs in the fuel cell, the power converter, or the system or load.

4. The apparatus of claim 3, wherein the switching element includes a magnetic contactor (MC).

5. The apparatus of claim 1, further comprising:
   a second initial charge circuit connected in series between an output terminal of the power converter and the system or load and configured to cut off an inrush current to the system or load.

6. The apparatus of claim 1, wherein the controller operates the first initial charge circuit to reduce the OCV of the fuel cell, when the failure occurs in the fuel cell, the power converter, or the system or load.

7. The apparatus of claim 1, wherein the power converter includes:
   a direct current/alternating current (DC/AC) inverter configured to convert DC power generated by the fuel cell into AC power.

8. The apparatus of claim 1, further comprising:
   a filter device connected with an output terminal of the power converter and configured to remove a noise of power output from the power converter.

9. A method for converting power of a fuel cell for power generation, the method comprising:
   converting and supplying, by a power converter, power generated by the fuel cell to a system or load;
   detecting, by a controller, a failure occurring in the fuel cell, the power converter, or the system or load, while the fuel cell is driven;
   reducing, by the controller, an open circuit voltage (OCV) of the fuel cell by a dummy resistor connected with an output terminal of the fuel cell, when the failure occurs in the fuel cell, the power converter, or the system or load; and
   cutting off, by a first initial charge circuit connected in parallel between the output terminal of the fuel cell and an input terminal of the power converter, an inrush current from the fuel cell,
   wherein the reducing of the OCV of the fuel cell by the dummy resistor connected with the output terminal of the fuel cell by the controller includes:
   monitoring, by the controller, the OCV of the fuel cell in a process where the fuel cell is stopped; and
   increasing, by the controller, current flowing in the dummy resistor such that the OCV of the fuel cell is less than a reference voltage.

10. The method of claim 9, wherein the reducing of the OCV of the fuel cell by the dummy resistor connected with the output terminal of the fuel cell by the controller includes:
    reducing, by the controller, the OCV of the fuel cell by the dummy resistor connected in parallel between the output terminal of the fuel cell and an input terminal of the power converter.

11. The method of claim 9, further comprising:
    stopping, by the controller, a current linkage to the system or load by controlling, by the controller, a switching element connected with an input terminal and an output terminal of the power converter to be turned off, when the failure occurs in the fuel cell, the power converter, or the system or load.

12. The method of claim 11, wherein the stopping of the current linkage to the system or load by the controller by controlling, the controller, the switching element connected with the input terminal and the output terminal of the power converter to be turned off includes:
   stopping, by the controller, the current linkage to the system or load by controlling, by the controller, a magnetic contactor (MC) connected with the input terminal and the output terminal of the power converter to be turned off.

13. The method of claim 9, further comprising:
   cutting off, by a second initial charge circuit connected in series between an output terminal of the power converter and the system or load, an inrush current to the system or load.

14. The method of claim 9, further comprising:
   operating, by the controller, the first initial charge circuit to reduce the OCV of the fuel cell, when the failure occurs in the fuel cell, the power converter, or the system or load.

15. The method of claim 9, wherein the converting and supplying of the power generated by the fuel cell to the system or load by the power converter includes:
   converting, by the power converter, DC power generated by the fuel cell into AC power by a DC/AC inverter.

16. The method of claim 9, further comprising:
   removing, by a filter device connected with an output terminal of the power converter, a noise of power output from the power converter.

* * * * *